United States Patent [19]

Sheng

[11] Patent Number: 4,672,625
[45] Date of Patent: Jun. 9, 1987

[54] METHODS AND APPARATUS FOR MAXIMIZING THE POWER OUTPUT OF A GAS LASER

[75] Inventor: Shinan-Chur Sheng, Sunnyvale, Calif.
[73] Assignee: Spectra-Physics, Inc., San Jose, Calif.
[21] Appl. No.: 595,457
[22] Filed: Mar. 30, 1984
[51] Int. Cl.$^4$ ............................ H01S 3/08; H01S 3/10
[52] U.S. Cl. ........................................ 372/99; 372/19; 372/55; 372/60
[58] Field of Search ........................ 372/55, 19, 29, 33, 372/99, 60, 37

[56] References Cited

U.S. PATENT DOCUMENTS 3,718,868 2/1973 Pao et al. ............................... 372/55

OTHER PUBLICATIONS

V. A. Balakin et al., "A Three Wave Helium–Neon Laser", *Moscow Engineering-Physics Institute*, Translated from Pribory; Tekhnika Eksperimenta, No. 1, pp. 165–166, Jan.–Feb. 1976.

Primary Examiner—James W. Davie
Attorney, Agent, or Firm—Donald C. Feix; Paul Davis

[57] ABSTRACT

The power output of a gas laser is maximized by (1) suppressing high order transverse modes, (2) broadening the gain curve to increase the number of axial modes that can lase in a given length of cavity and to thereby reduce power variation due to longitudinal mode sweeping resulting from thermal effects on cavity length, (3) suppressing unwanted infrared lasing activity, and (4) reducing beating noise resulting from frequency offset due to dispersion.

9 Claims, 33 Drawing Figures

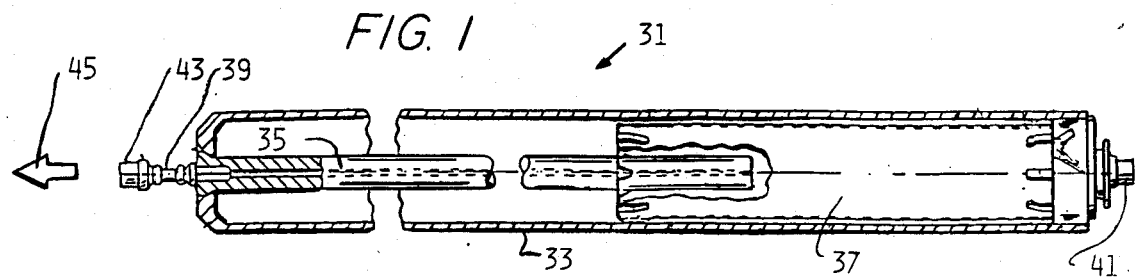
FIG. 1
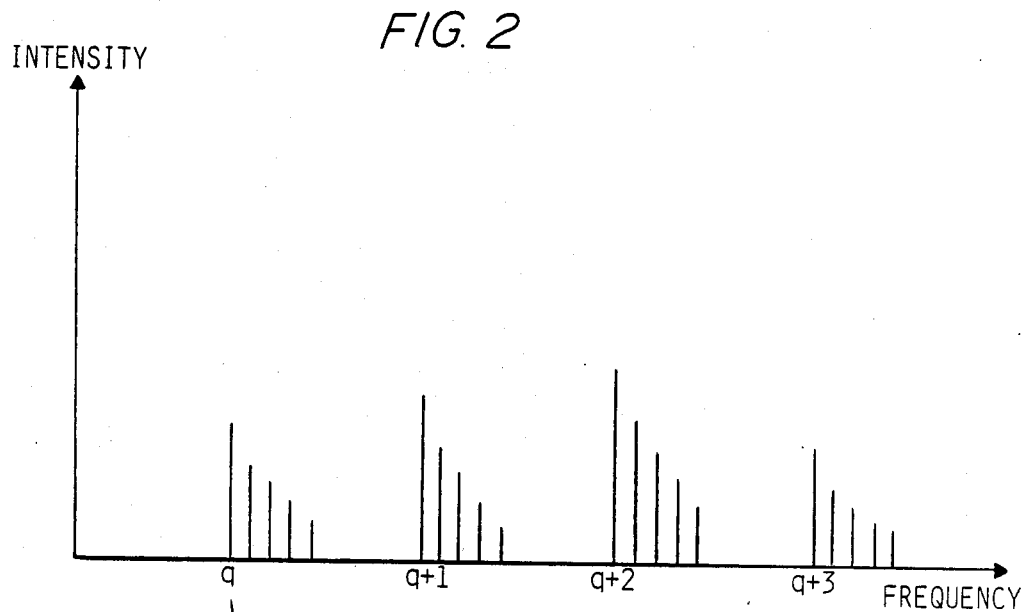
FIG. 2
FIG. 2-A
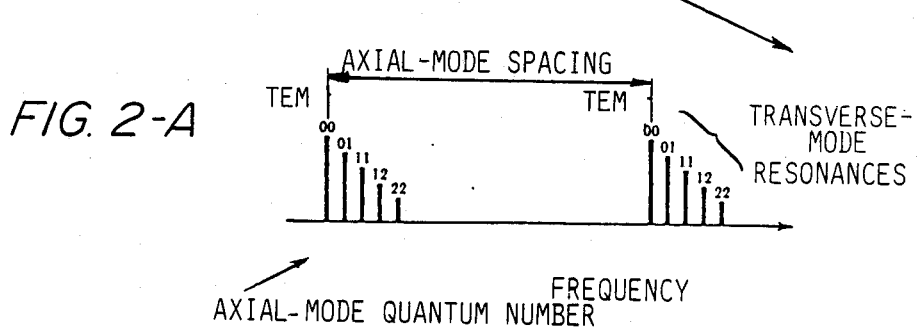
FIG. 5
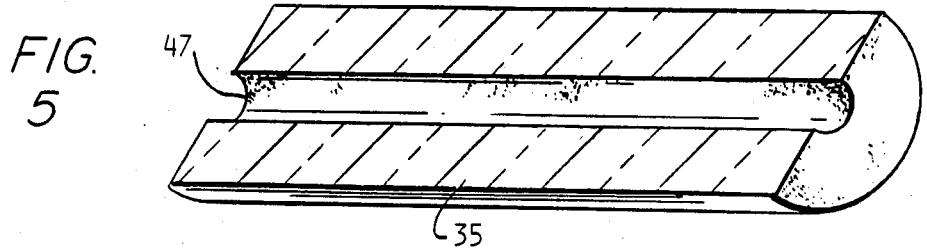

GAUSSIAN DISTRIBUTION OF THE LIGHT INTENSITY OVER THE BEAM CROSS SECTION FOR A LASER OSCILLATING IN THE TEM$_{00}$ MODE

FIG. 4-A
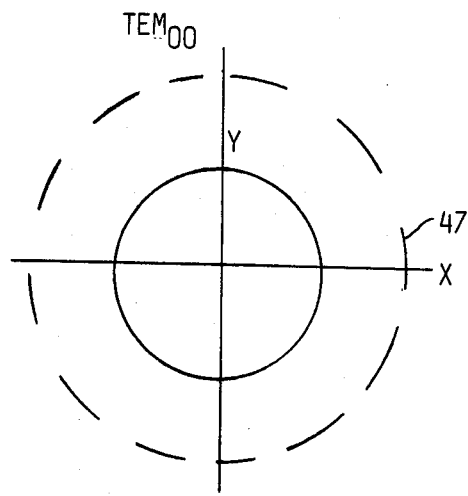
FIG. 4-B
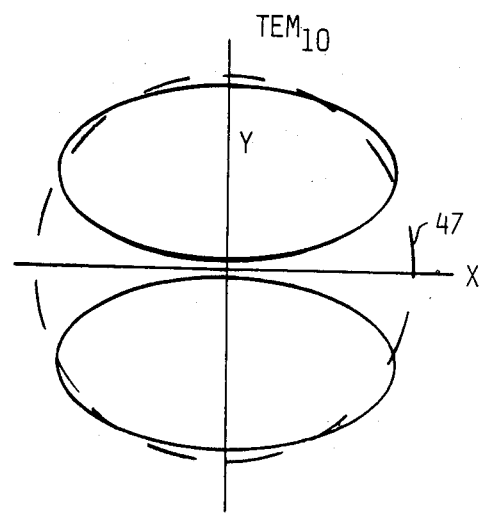
FIG. 4-C
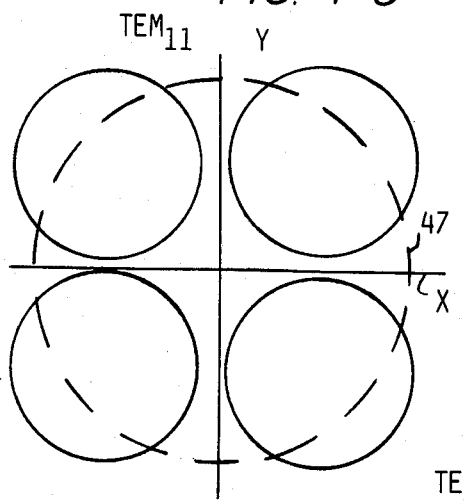
FIG. 4-D
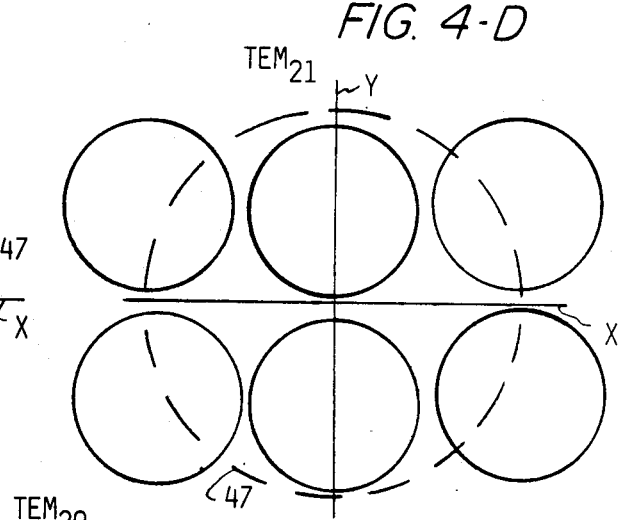
FIG. 4-E
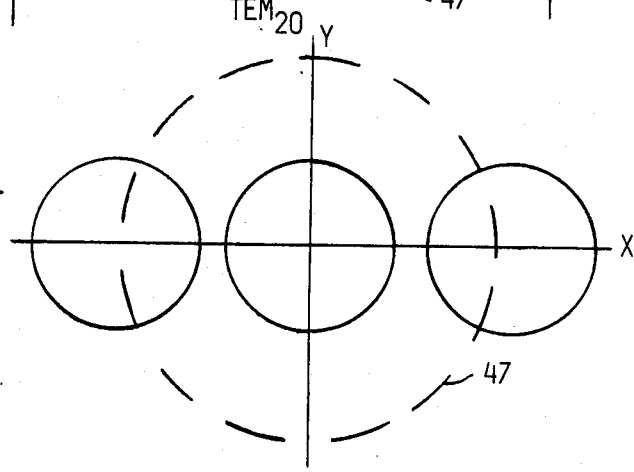

PRESENT INVENTION

PRESENT INVENTION

METHODS AND APPARATUS FOR MAXIMIZING THE POWER OUTPUT OF A GAS LASER

BACKGROUND OF THE INVENTION:

This invention relates to methods and apparatus for maximizing the power output of gas lasers.

The present invention has particular application to Helium-Neon gas lasers.

Gas lasers of the kind to which the present invention relates have a cavity located between two end mirrors, and one mirror is coated to transmit a portion of the laser beam through the mirror.

The cavity of a gas laser of this kind can be operated in a variety of oscillation modes.

Depending to some extent on the length of the cavity, there may be a number of longitudinal modes in oscillation between the mirrors.

In addition to the longitudinal modes of oscillation, transverse modes can be sustained simultaneously. These transverse modes are known as transverse electric and magnetic ($TEM_{mn}$) modes because the fields are nearly normal to the cavity axis. The subscripts m and n specify the integral number of transverse nodal lines across the emerging beam.

The simplest mode, $TEM_{00}$, has a flux density across the beam cross section which is approximately gaussian; and there are no phase changes across the beam, as there are in other modes.

For many applications it is desirable to operate the laser in only the $TEM_{00}$ mode while avoiding the production of higher order transverse modes. The problem of eliminating non $TEM_{00}$ modes is accentuated by increasing the length of the laser.

One way of avoiding higher order transverse modes in the lasers of the prior art was to restrict the higher order modes by limiting the aperture size of the bore. This caused a higher diffraction loss of the higher order modes than of the $TEM_{00}$ mode with the result that a purer $TEM_{00}$ mode output was obtained; but it also could reduce the power output of the laser.

An important object of the present invention is to suppress high order transverse modes in a way that does not depend upon restricting the high order modes by diffraction loss.

It is a related object to suppress the high order transverse modes by constructing the mirror transmission in a way that causes each $TEM_{00}$ mode to burn large enough holes to leave insufficient energy in the cavity for continuous lasing of higher order modes in the saturated gain, equilibrium state of operation of the laser.

Another factor which can reduce the power output of a gas laser is longitudinal mode sweeping. Longitudinal mode sweeping can result from variations in the mirror spacing caused by thermal effects.

The problem of mode sweeping becomes more acute as the length of the laser gets smaller. For example, with HeliumNeon gas lasers having a length of four inches or less, there may be only one mode existing in the cavity. If this mode sweeps in, lasing action is produced and the laser produces the power output desired. If, however, the mode sweeps out of the cavity, there can be a 100% dropoff of power.

Since variation in the mirror spacing with temperature changes is very difficult to completely eliminate, a reduction in power output, particularly with the lasers of relatively short cavity length, has been a problem in the prior art.

It is an important object of the present invention to reduce the longitudinal mode sweeping in a gas laser by broadening the gain curve to increase the number of modes that can lase in the cavity to thereby reduce the drop in power output resulting from mode sweeping (as compared to the drop in power output for an equivalent length laser having fewer modes under a more narrow gain curve).

It is a related object of the present invention to broaden the gain curve by using an isotope mixture of one of the gases in the cavity.

Another factor that has contributed to reducing the power output of Helium-Neon gas lasers has been unwanted infrared lasing activity.

Because the 0.6328 micron red photon transition shares the same upper level state as a 3.39 micron infrared photon transition, both transitions compete for the resources of the same, common source. If the superradiance of the infrared transition is not suppressed, the power output of the 0.6328 micron transition can be substantially reduced. This problem became particularly severe with increasing gain in Helium-Neon lasers. At about 10 milliwatt power or greater output the 3.39 micron transition can come strongly into play so that a lot of power may be absorbed by the 3.39 micron infrared transition in Helium-Neon lasers designed for power outputs of 10 milliwatt or more for the 0.6328 micron.

In the prior art magnets were positioned near the laser gain tube for the purpose of suppressing the 3.39 micron transition by means of Zeeman splitting. The magnetic field acted on the Neon gas and caused Zeeman splitting and broadened the transition at 3.39 microns.

The use of magnets to suppress the 3.39 micron transition is difficult to apply to a laser having a coaxial structure because it is difficult to put the magnets close to the bore in a coaxial laser. The magnets must be very large, to be effective, if mounted on the outside tube of the coaxial laser.

It is an important object of the present invention to suppress the 3.39 micron transition in a Helium-Neon gas laser without the need for magnets.

It is a related object to reduce the peak gain in the cavity by an amount which highly suppresses the superradiance of the 3.39 micron transition and to use an isotope mixuture of the Neon gas for providing this reduction in the peak gain.

It is another related object to construct a mirror transmission to be an amount low enough to cause the gain of the 0.6328 micron red photon transition to assist substantially in the suppression of the gain of the 3.39 micron infrared photon transition.

Another problem in obtaining smooth power output from Helium-Neon gas lasers is the problem of reducing beating noise resulting from frequency offset due to dispersion.

It is an important object of the present invention to reduce the beating noise by increasing the number of gain curves and to use a mixture of isotopes for the Neon gas for this purpose.

SUMMARY OF THE INVENTION

The present invention provides methods and apparatus for maximizing the power output of gas lasers, particularly Helium-Neon gas lasers.

High order transverse modes are suppressed by using a mirror transmission that causes each $TEM_{00}$ modes to burn large enough holes to leave insufficient energy in the cavity for continuous lasing of high order modes in the saturated gain, equilibrium state of operation of the laser. This reduced mirror transmission (as compared to the mirror transmission of the prior art) acts in a manner to artificially boost the cavity power for the hole burning by the $TEM_{00}$ modes and to suppress the high order modes without the need to rely on choking or aperture chopping off of the high order modes. The overall power output of the present invention is increased (as compared to prior art lasers of comparable length which used diffraction loss by aperture chopping to suppress high order transverse modes).

Longitudinal mode sweeping and power fluctuations are reduced, as compared to the prior art, by broadening the gain curve by means of an isotope mixture of one of the gases in the cavity. This broadening of the gain curve increases the number of modes that can lase in the cavity, as compared to the number of modes that can lase without an isotope mixture. It is of particular benefit as the length of the laser decreases; because, as the length of the cavity decreases, fewer modes can lase in the cavity. The present invention has enabled a Helium-Neon laser of 4 inch length to be developed for commercial use.

The present invention suppresses unwanted infrared lasing activity in a Helium-Neon gas laser without the need for magnets around the cavity bore. The present invention accomplishes this by reducing the peak gain in the cavity by an amount which highly suppresses the superradiance of the 3.39 micron infrared transition. The reduction in the peak gain is obtained by using an isotope mixture of the Neon gas.

The present invention also utilizes a lower mirror transmission (as compared to the mirror transmissions of the prior art) which causes the gain of the 0.6328 micron red photon transition to assist substantially in the suppression of the gain of the 3.39 micron infrared photon transition.

The present invention reduces the beating noise resulting from frequency offset due to dispersion in a Helium-Neon gas laser by using a mixture of isotopes for the Neon gas. The isotope mixture is effective to increase the number of gain curves, as compared to the number of gain curves produced by a Neon gas composed of a single Neon isotope, so that the composite gain of the isotope mixture produces a reduced amplitude effective to substantially cancel the beating noise produced by Neon gas composed of a single isotope.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a side elevation view of a coaxial tube, Helium-Neon gas laser. FIG. 1 is partly in cross section to show details of construction. The Helium-Neon gas laser shown in FIG. 1 is one embodiment of a gas laser in which the methods and apparatus of the present invention are used.

FIG. 2 is a graph of intensity versus frequency for transverse modes of oscillation within a laser cavity of a gas laser of the kind shown in FIG. 1.

FIG. 2A is an expanded view (as indicated by the arrows leading from FIG. 2 to FIG. 2A) of a portion of FIG. 2. FIG. 2A shows the relationship of high order transverse electric and magnetic ($TEM_{mn}$ modes) with respect to a related $TEM_{00}$ mode of a given frequency.

FIG. 4A is a plan view on the XY plane shown in FIG. 3 showing the footprint of the light from the $TEM_{00}$ mode of FIG. 3 and showing the relationship of the inside diameter of the laser bore tube with respect to that footprint.

FIGS. 4B through 4E are views like FIG. 4A but showing the footprint of the light intensity for the beam cross sections for a laser oscillating in the TEM modes indicated in each of those figures. FIGS. 4C through 4E in particular, illustrate how the aperture formed by the bore ID has been used in the prior art to suppress high order modes by diffraction loss.

FIG. 5 is a fragmentary view of the part of the bore tube of the laser shown in FIG. 1. In FIG. 5 the bore tube has been shown cut in half longitudinally to illustrate the aperture effect produced by the internal diameter of the tube.

Figure 6:
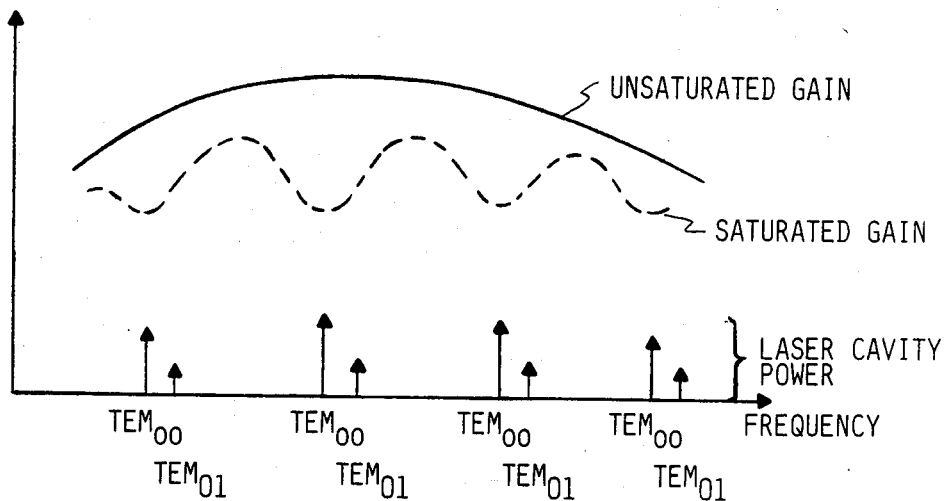
FIG. 6 is a graph showing the relationship of the $TEM_{00}$ and $TEM_{01}$ modes with respect to both the unsaturated gain and the saturated gain in a gas laser operating with both of these transverse modes oscillating.
Figure 7:
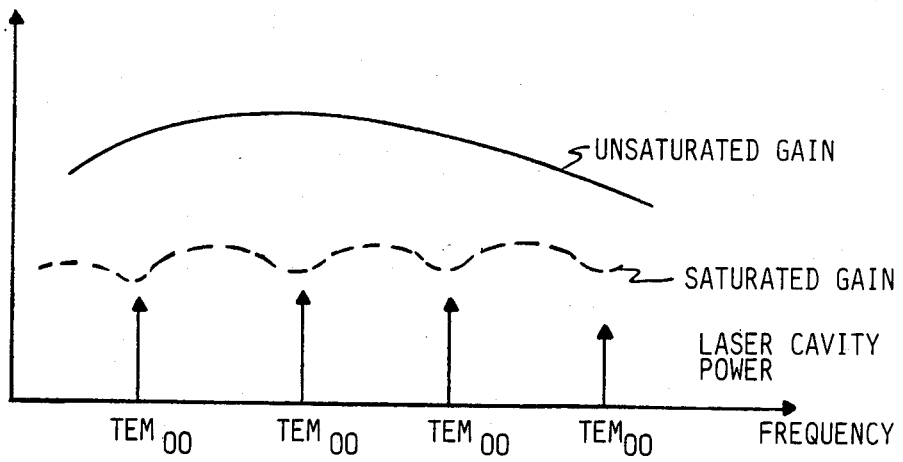

FIG. 7 is a view like FIG. 6 but showing how a higher laser cavity power saturates the gain enough such that the $TEM_{01}$ and higher order modes are completely suppressed in a laser constructed and operated in accordance with the present invention. In this embodiment of the present invention the mirror transmission is matched to an amount that causes each $TEM_{00}$ mode to burn large enough holes to leave insufficient energy in the cavity for continuous lasing of higher order modes.

FIGS. 8 through 12 relate to infrared transition in a Helium-Neon gas laser and suppression of that transition.

Figure 8:
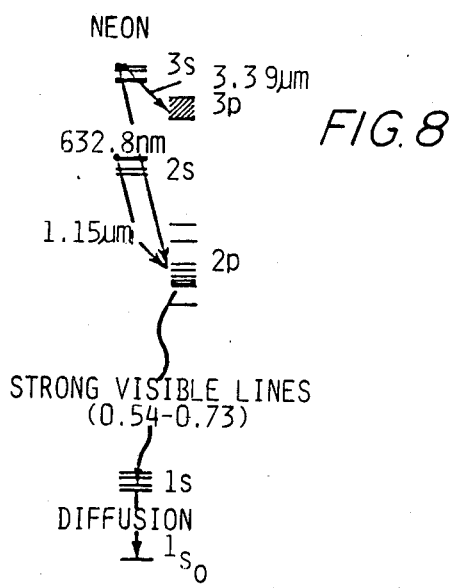

FIG. 8 is an energy level diagram showing how the 3.39 micron infrared photon transition shares the same upper level state as the 0.6328 micron red photon transition so that both transitions compete for the resources of the same common source. This competition can cause power fluctuations as the Helium-Neon laser is constructed to produce larger power outputs, and it is necessary to suppress the 3.39 micron transition for smooth 0.6328 micron operation.

Figure 9:
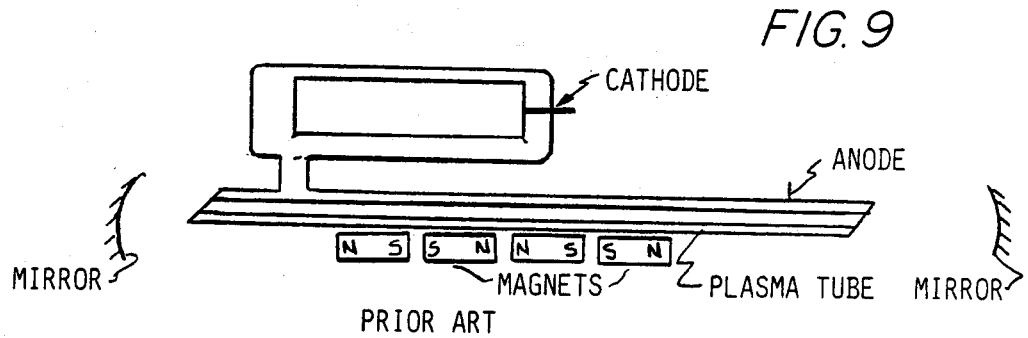

FIG. 9 shows a prior art technique in which magnets are placed near the gain tube to suppress the 3.39 micron transition by means of Zeeman splitting.

Figure 10:
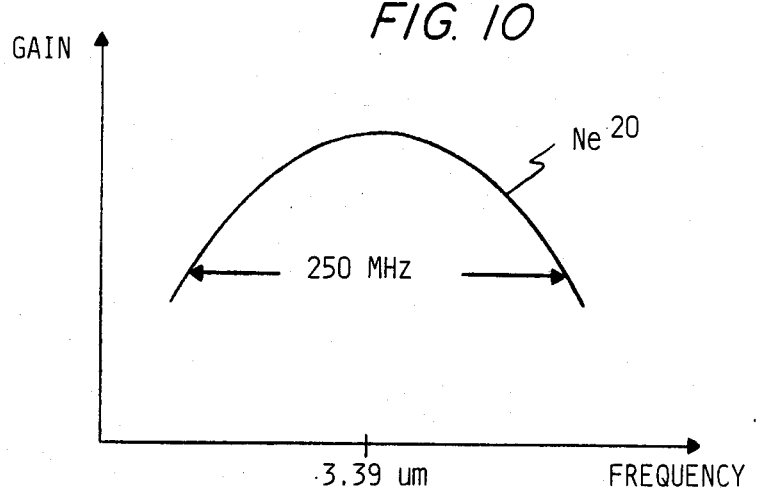

FIG. 10 is a graph illustrating that, for a single isotope $Ne^{20}$, the Doppler width of the 3.39 micron transition is about 250 mega Hz.

Figure 11:
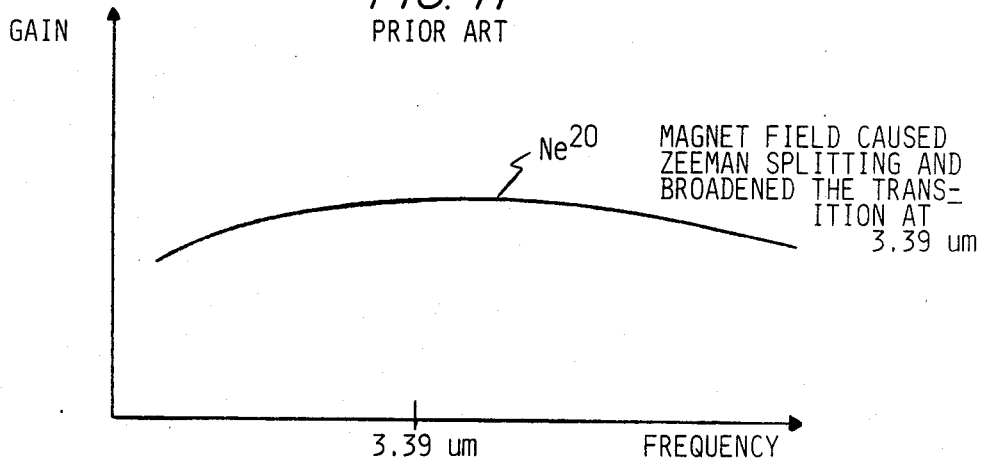

FIG. 11 is a graph illustrating how, for $Ne^{20}$, a magnet field causes Zeeman splitting and broadens the transition at 3.39 micron with the prior art magnet technique.

Figure 12:
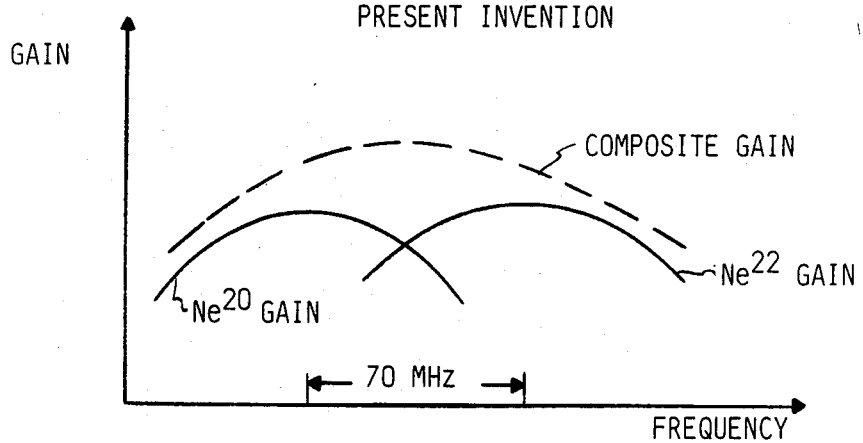

FIG. 12 is a graph illustrating how, in one embodiment of the present invention, an isotope mixture of $Ne^{20}$ and $Ne^{22}$ produces a composite gain which effectively broadens the transition and reduces the 3.39 micron competition. As illustrated in FIG. 12, the center of the gain curve for the $Ne^{22}$ isotope is offset far enough (about 70 mega Hz) from the center of the gain curve for the $Ne^{20}$ isotope to reduce the peak gain of the composite gain by an amount which highly suppresses the superradiance of the infrared transition.

FIGS. 13 through 20 relate to longitudinal mode sweeping and to method and apparatus for broadening the gain curve in accordance with the present invention to reduce power variation due to longitudinal mode sweeping.

Figure 13:
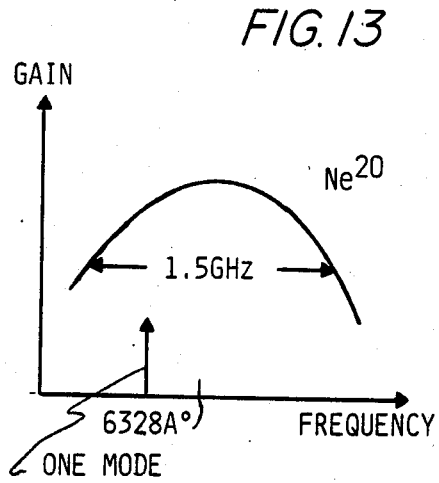

FIG. 13 is a graph showing how the $Ne^{20}$ isotope has its Doppler width of 1.5 giga Hz near the 6338A° transition.

Figure 14:
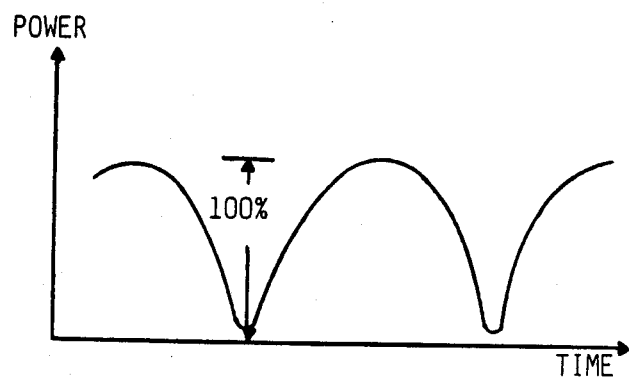

FIG. 14 shows, in conjunction with FIG. 13, how the power may fluctuate up to 100% (as the laser expands or contracts due to thermal environment change) if the laser is a short laser, and has a mode to mode spacing greater than the 1.5 giga Hz Doppler width shown in FIG. 13.

Figure 15:
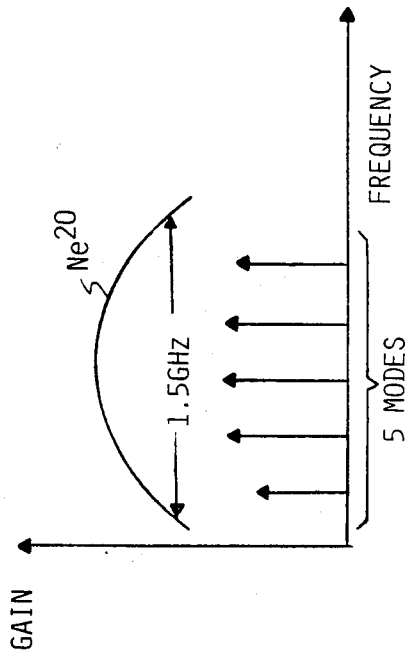

FIG. 15 is a graph generally like FIG. 13, but for a laser having a longer length than the FIG. 13 laser. FIG. 15 shows there are more axial modes in lasing as the laser length increases (five modes are illustrated in FIG. 15 as compared to the single mode in FIG. 13).

Figure 16:
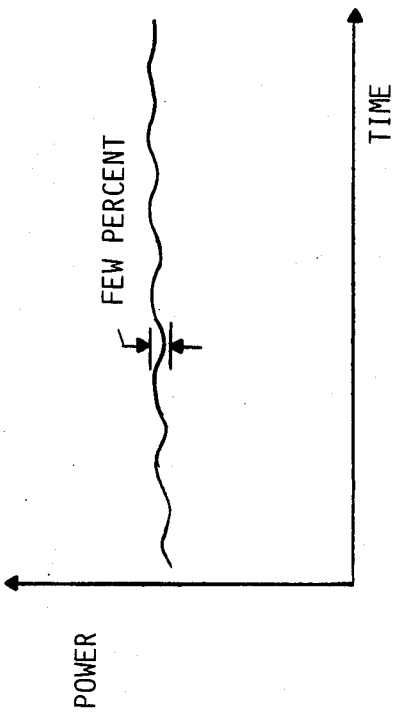

FIG. 16 illustrates that a change in the cavity length for the longer length laser illustrated in FIG. 15 produces only a few percent change in power output and is therefore not as critical as a change in cavity length for the shorter length laser illustrated in FIG. 13 (where the cavity length change can produce a 100% power fluctuation).

Figure 17:
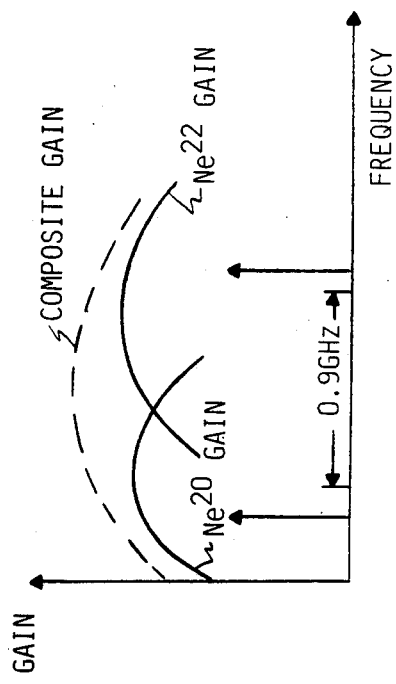

FIG. 17 is a graph like FIG. 13 for the same short laser as illustrated in FIGS. 13 and 14, but FIG. 17 shows how an equal mixture of isotopes of $Ne^{20}$ and $Ne^{22}$, used in accordance with the present invention, produces additional axial modes of lasing.

Figure 18:
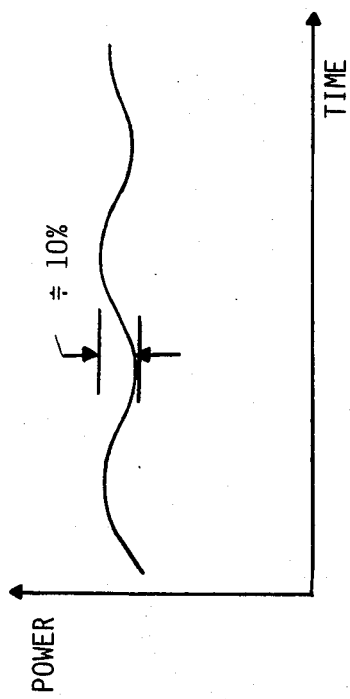

FIG. 18 shows a substantial reduction in the power fluctuation for the FIG. 17 isotope mixture having multiple modes lasing (as compared to the single mode lasing shown in FIG. 13) with changes in length of the laser.

Figure 19:
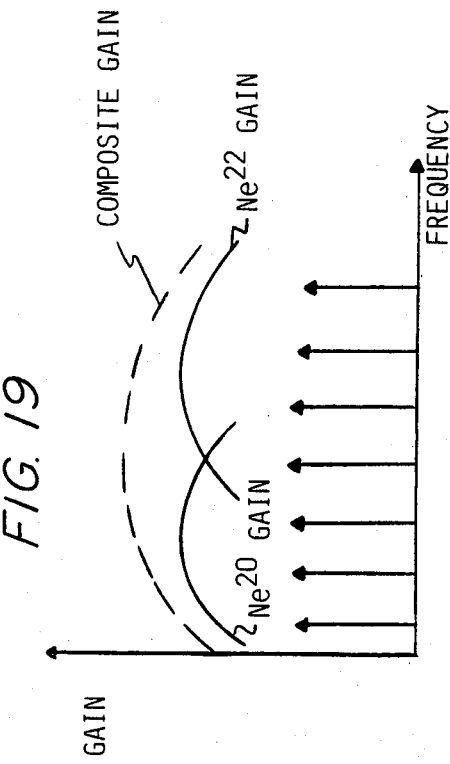

FIG. 19 shows the isotope mixture of the present invention when used in the same long laser shown in FIG. 15. FIG. 19 shows how more axial modes of lasing are obtained with the isotope mixture of the present invention (in any given length of laser) because the isotope mixture expands the gain curve.

Figure 20:
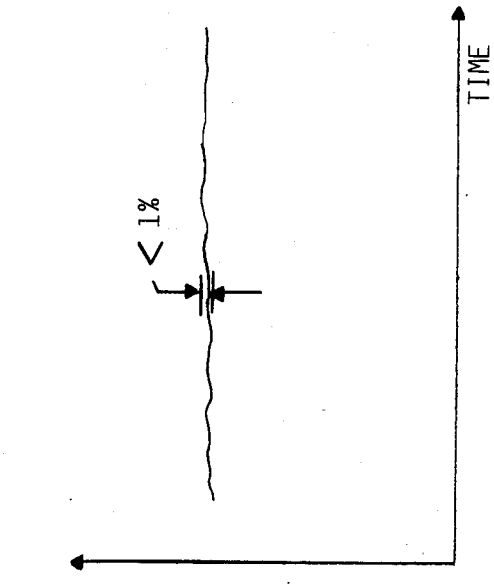

FIG. 20 shows how the resultant power fluctuation is further reduced (as compared to the FIG. 16 power curve fluctuation) by using the isotope mixture of the present invention.

FIGS. 21 through 28 relate to beating noise resulting from frequency offset due to dispersion and to methods and apparatus of the present invention which reduce the beating noise.

Figure 21:
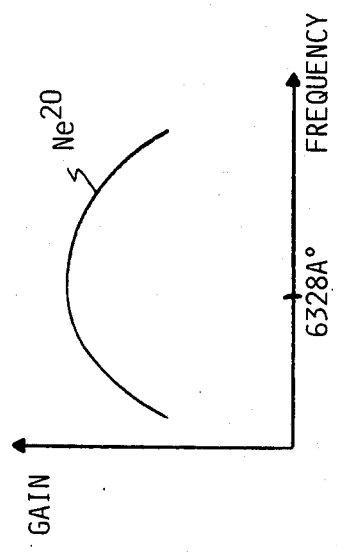

FIG. 21 shows a gain curve for a single isotope $Ne^{20}$ gas in a Helium-Neon gas laser.

Figure 22:
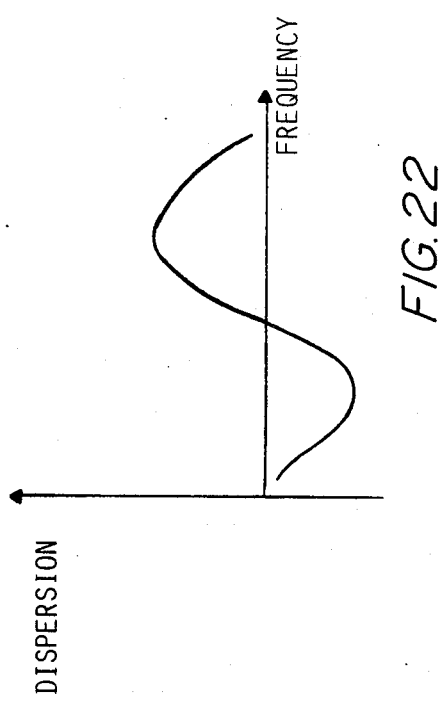

FIG. 22 illustrates how dispersion means extra phase to the mode located at the corresponding frequency.

Figure 23:
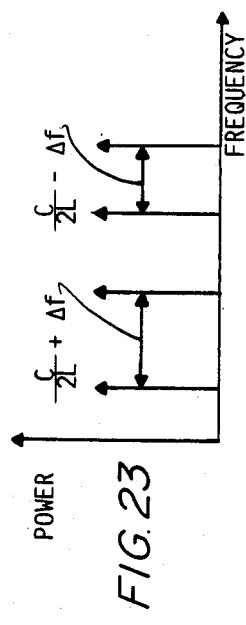

FIG. 23 shows how the dispersion causes a mode spacing change from the cold cavity value.

Figure 24:
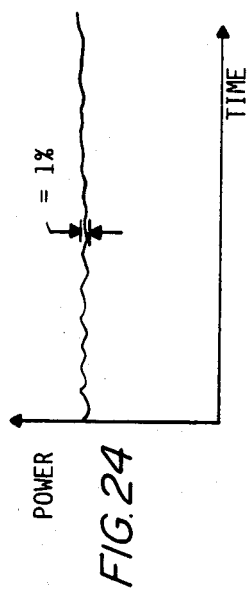

FIG. 24 illustrates how the beating of the modes present noise in the power output.

Figure 25:
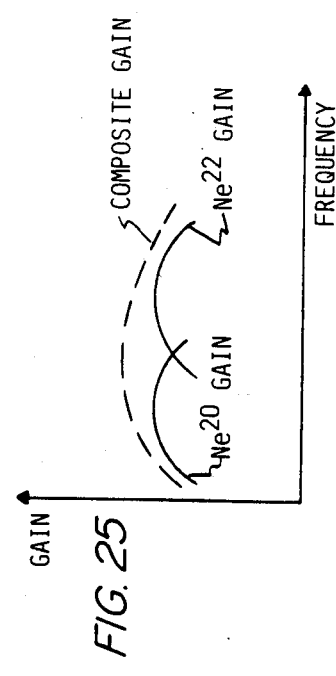

FIG. 25 shows the composite gain for an isotope mixture of $Ne^{20}$ and $Ne^{22}$ of the present invention.

Figure 26:
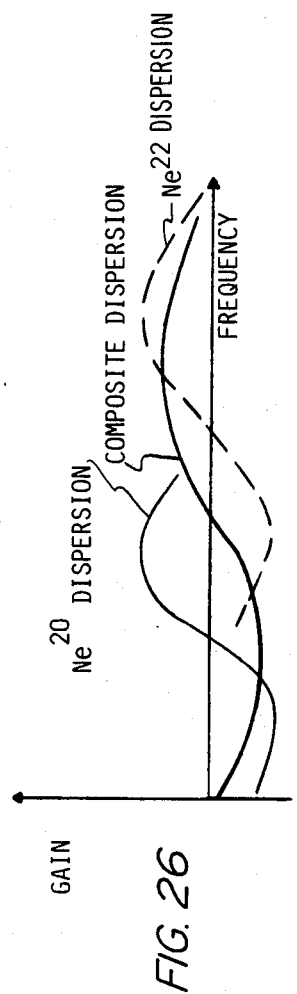

FIG. 26 shows how an equal mixture of $Ne^{20}$ and $Ne^{22}$ effectively reduces the dispersion effect (as compared to the FIG. 22 dispersion resulting from a single isotope).

Figure 27:
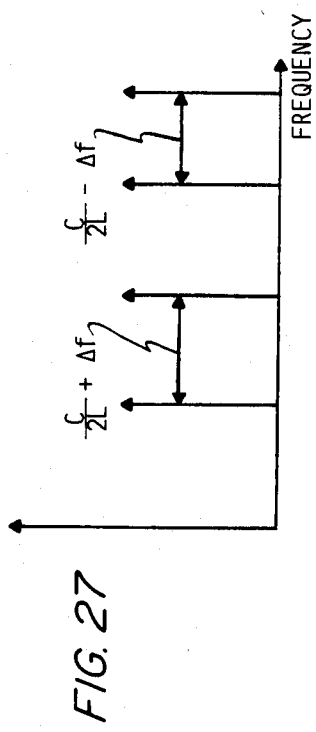

FIG. 27 illustrates how the frequency offset due to dispersion (with the isotope mixture of the present invention) is smaller than the frequency offset shown in FIG. 23.

Figure 28:
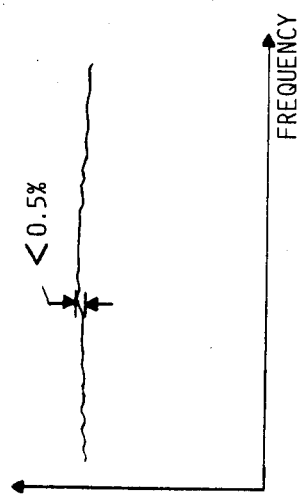

FIG. 28 shows how the noise in the power is reduced (as compared to the beating noise shown in FIG. 24) by the isotope mixture of the present invention.

DESCRIPTION OF THE PREFERRED EMBODIMENTS:

In FIG. 1 a Helium-Neon gas laser is indicated by the general reference numeral 31.

The Helium-Neon gas laser 31 is one embodiment of a gas laser in which the methods and apparatus of the present invention are used for maximizing the power output of the gas laser.

The methods and apparatus of the present invention maximize the power output by (1) suppressing high order transverse modes, (2) broadening the gain curve, by means of an isotope mixture, to increase the number of modes that can lase in the cavity and to thereby reduce power loss due to longitudinal mode sweeping resulting from thermal effects on the cavity length, (3) suppressing unwanted infrared lasing activity, and (4) reducing beating noise resulting from frequency offset due to dispersion.

The way in which the present invention accomplishes each of these results will be described below and in the order as listed above.

As shown in FIG. 1 the gas laser is a coaxial laser having an outer tube 33, an inner bore tube 35, a cathode 37, an anode 39, end mirrors 41 and 43, and a cavity between the end mirrors.

The mirror 43 is coated to transmit a portion of the laser beam through the mirror, as indicated by the block arrow 45.

As best illustrated in FIG. 5 the bore tube 35 has an inner bore 47 of relatively small internal diameter for confining the gaseous medium in which the lasing activity occurs.

In the prior art lasers, the internal diameter of this bore tube has also been used as an optical aperture (as will be described in greater detail with reference to FIGS. 4B through 4E below) for assisting in the suppression of high order transverse modes; but the methods and apparatus of the present invention achieve the desired suppression of high order transverse modes without the need to rely on restriction of high order transverse modes by diffraction loss produced by the aperture effect of the bore tube.

As illustrated in FIGS. 2 and 2A, a number of transverse modes may coexist with each $TEM_{00}$ axial mode unless the high order modes are restricted or repressed.

Figure 3:
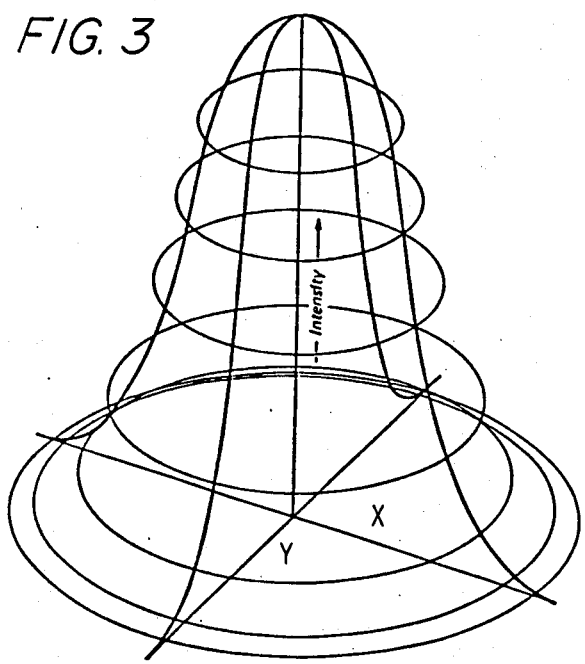
FIG. 3 is an isometric view illustrating the gaussian distribution of light intensity over the beam cross section for a laser oscillating in the $TEM_{00}$ mode.

FIG. 3 illustrates the gaussian distribution of light intensity over the beam cross section for a laser oscillating in only the $TEM_{00}$ mode. FIG. 4A is a plan view showing the footprint of that light intensity on the XY plane of FIG. 3. FIG. 4A also shows, in dashed outline, the internal diameter 47 of the bore tube 35 with respect to that same XY plane for a laser constructed in accordance with the present invention. As shown in FIG. 4A, the method and apparatus of the present invention enable the full light intensity of the $TEM_{00}$ mode to be obtained without any chopping by the internal diameter 47 of the bore tube 35.

Suppression of the high order transverse modes has been a problem in the prior art. There is competition between the high order modes and the $TEM_{00}$ mode in the sense that the atoms of the $TEM_{01}$ mode, for example, will interact with an atom whose frequency is nearby so as to reduce the energy available for production of the $TEM_{00}$ mode. As a result, if the high order modes are not restricted or suppressed, one or more high order modes may oscillate simultaneously with the $TEM_{00}$ mode so as to produce one or more of the footprints shown in FIGS. 4B through 4E.

The prior art used the internal diameter 47 of the bore tube 35 as an aperture to produce a diffraction loss in the high order modes and to therefore produce a purer $TEM_{00}$ mode. One disadvantage of this prior art technique is that a purely diffraction loss mechanism can also hurt the $TEM_{00}$ mode to some extent. Another disadvantage is that the $TEM_{01}$ mode cannot be completely eliminated by purely diffraction loss without choking the bore internal diameter size down to the point at which the power output of the laser is restricted to an unacceptable extent. So, in the prior art, a little bit of the $TEM_{01}$ was tolerated to obtain a satisfactory level of power performance, even though the existance of the $TEM_{01}$ mode was undesirable for many applications of the laser.

The present invention eliminates the $TEM_{01}$ mode without resorting to diffraction loss techniques.

In accordance with the present invention the cavity power is boosted to cause the $TEM_{00}$ modes to burn large enough holes to leave insufficient energy in the cavity for continuous lasing of higher order modes. This is best illustrated by comparing FIG. 7 to FIG. 6.

FIG. 6 shows the relationship of the saturated gain curve to the unsaturated gain curve for a prior art laser construction.

FIG. 7 shows the relationship of the saturated gain curve to the unsaturated gain curve for a laser constructed and operated in accordance with the present invention.

As illustrated in FIG. 7, each of the $TEM_{00}$ modes pulls down the saturated gain curve to a level at which the $TEM_{01}$ mode cannot coexist. This pulling down of the saturated gain curve by the $TEM_{00}$ modes is accomplished by increasing the laser cavity power (see FIG. 7), and the increase in the laser cavity power as compared to the cavity power of the prior art lasers (see FIG. 6), is achieved by decreasing the transmission of the window 43 (see FIG. 1) as compared to the prior art. By increasing the laser cavity power, each $TEM_{00}$ mode burns a bigger, deeper, wider hole so as to utilize the energy in the nearby atoms to the point where the $TEM_{01}$ mode cannot obtain enough energy to oscillate or lase.

Thus, by changing the coating on the mirror 43 to reduce the amount of light transmitted through the mirror and to thereby increase the power in the cavity, the overall power output of the laser is increased and a pure $TEM_{00}$ mode is produced during operation in the saturated gain, equilibrium state of operation of the laser because high order modes are suppressed.

In a specific embodiment of the present invention the mirror 43 transmission is in the range of 0.8% to 1.5% for a 15 milliwatt Helium-Neon gas laser having a length of 20 inches. This transmission percentage is substantially lower (about half) than the traditional design approach.

As will be described in more detail below, reducing the transmission of the mirror 43 also has benefits in suppressing unwanted infrared lasing activity in a Helium-Neon gas laser.

FIGS. 8 through 12 relate to infrared transition in a Helium-Neon gas laser and suppression of that transition.

FIG. 8 is an energy level diagram showing how the 3.39 micron infrared photon transition shares the same upper level state as the 0.6328 micron red photon transition so that both transitions compete for the resources of the same common source. This competition can cause power fluctuations, and it is necessary to suppress the 3.39 micron transition for smooth 0.6328 micron operation. This need to suppress the 3.39 micron infrared transition becomes more important as Helium-Neon lasers are constructed to produce higher power outputs.

The usual, prior art way to reduce the 3.39 micron transition is by use of magnets.

As illustrated in FIG. 9, it is relatively easy to arrange magnets close to the bore in an external cavity laser.

The use of magnets is, however, impractical in a coaxial bore laser, because it is impractical to put the magnets close to the inner bore tube and because quite large magnets are required when the magnets are located on the outside of the outer tube 33 in the coaxial gas laser of the kind illustrated in FIG. 1.

FIG. 10 shows that, for a single isotope $Ne^{20}$, the Doppler width of the 3.39 micron transition is about 250 mega Hz.

The magnetic field produced by the magnets shown in FIG. 9 causes Zeeman splitting and broadens the transition at 3.39 microns in the way shown in FIG. 11. This prior art technique suppresses the 3.39 micron transition by using Zeeman splitting.

FIG. 12 illustrates how, in one embodiment of the present invention, an isotope mixture of $Ne^{20}$ and $Ne^{22}$ produces a composite gain which effectively broadens the transition and reduces the 3.39 micron competition with the 0.6328 micron transition. As illustrated in FIG. 12, the center of the gain curve for the $Ne^{22}$ isotope is offset far enough (about 70 mega Hz) from the center of the gain curve for the $Ne^{20}$ isotope to reduce the peak gain of the composite gain by an amount which highly suppresses the supperradiance of the infrared transition. By killing off the 3.39 micron transition in this way, it is possible to get all of the power out of the red photon 0.6328 micron transition.

The isotope mixture of the present invention suppresses the gain of the infrared transition without the need for mounting magnets close to the cavity bore.

As mentioned briefly above, the present invention also controls the coating and transmission of the mirror 43 to suppress the unwanted infrared superradiance. By decreasing the transmission of the mirror, as compared to the prior art, the present invention increases the cavity power. This enhances the competitive edge of the 0.6328 micron red photon with respect to the 3.39 micron infrared photon to suppress the 3.39 micron transition. As a result, coaxial lasers made in accordance with the present invention can produce power outputs in excess of 10 milliwatt without using magnets.

Another problem in obtaining desired power output with prior art Helium-Neon lasers arises out of longitudinal mode sweeping as the laser expands or contracts due to thermal environment change. This problem is particularly acute if the laser has a relatively short length.

As illustrated in FIGS. 13 and 14, the $Ne^{20}$ isotope has a Doppler width of 1.5 giga Hz near the 6328A° transition. If the laser is a short laser with a mode to mode spacing greater than 1.5 giga Hz, then thermal expansion or contraction of the laser length may cause the power to fluctuate up to 100% (as illustrated in FIG. 14) because the single mode can sweep out of the cavity without another mode sweeping in.

This problem of longitudinal mode sweeping is less of a problem as the length of the laser increases; because, as shown in FIG. 15, longer length lasers will have more axial modes in lasing than shorter length lasers, assuming that both lasers have the same gas compositions. While the mode sweeping problem is not as acute in longer length lasers, because of the averaging effect which occurs in such longer length lasers, it can still produce undesirably large fluctuations in power output (as shown in FIG. 16).

In accordance with the present invention, an isotope mixture is used for the Neon gas to expand the gain curve and to cause more axial modes to lase in any given length of laser than occurs with a single Neon isotope gas.

FIG. 17 shows how the use of an equal mixture of isotopes $Ne^{20}$ and $Ne^{22}$, due to the isotopic shift of the 0.9 giga Hz of the 6328A°, enables the obtaining of two or more axial modes lasing (depending on the laser cavity length). By broadening the gain curve of a short length laser in accordance with the present invention (see FIG. 17) as compared to the gain curve produced for a short length laser of the prior art (see FIG. 13), there is a substantial reduction in the power loss due to longitudinal mode sweeping (as shown by the comparison of FIG. 18 to FIG. 14).

FIGS. 19 and 20 are views like FIGS. 15 and 16 but show the effects of broadening the gain curve by using the $Ne^{20}$, $Ne^{22}$ mixture in accordance with the present invention to obtain more axial modes lasing and consequent reductions in the power fluctuations as compared to the prior art.

FIGS. 21 through 28 relate to beating noise resulting from frequency offset due to dispersion and to methods and apparatus of the present invention which reduce the beating noise.

FIG. 21 shows the single isotope $Ne^{20}$ gain curve and FIG. 22 illustrates how dispersion means extra phase to the mode located at the corresponding frequency.

FIGS. 23 and 24 show how dispersion causes the mode spacing change from the cold cavity value (FIG. 23) and how the beating of the modes present noise in the power, which is roughly 1% and a few tens of kilo Hz in the prior art, single isotope, Helium-Neon gas lasers.

FIG. 25 shows the composite gain for an isotope mixture of $Ne^{20}$ and $Ne^{22}$ of the present invention.

FIG. 26 shows how an equal mixture of $Ne^{20}$ and $Ne^{22}$ effectively reduces the dispersion effect (as compared to the FIG. 22 dispersion resulting from a single isotope).

FIG. 27 illustrates how the frequency offset due to dispersion (with the isotope mixture of the present invention) is smaller than the frequency offset shown in FIG. 23. FIG. 28 shows how the noise and the power is reduced (as compared to the beating noise shown in FIG. 24) by the isotope mixture of the present invention.

The isotope mixture of the present invention produces a lot of cancelling and the pushing and pulling is much reduced so that basically the power output is quieter than the power output of the prior art using a single Neon isotope.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim :

1. A Helium-Neon gas laser of the kind in which a 0.6328 micron red photon transition shares the same upper level state as a 3.39 micron infrared photon transition so that both transitions compete for the resources of the same common source, said laser comprising, a cavity filled with a Helium-Neon gas mixture, reflecting mirrors at each end of the cavity with one of the mirrors coated to transmit a portion of the laser beam through the mirror while reflecting the rest of the laser beam back into the cavity, and wherein the coating on the mirror is constructed to have a transmission matched to the amount of transmission that causes the gain of the 0.6328 micron red photon transition to suppress the gain of the 3.39 micron infrared photon transition in the saturated gain, equilibrium state of operation of the laser so that unwanted infrared lasing activity is suppressed without the need for magnets around the cavity bore and wherein the mirror transmission is not greater than 1.5%.

2. The invention defined in claim 1 wherein the Neon gas is a mixture of $Ne^{20}$ and $Ne^{22}$ isotopes in a ratio, the ratio of the mixture being such that the center of the gain curve for the $Ne^{22}$ isotope is offset far enough from the center of the gain curve for the $Ne^{20}$ isotope so as to reduce the peak gain by an amount which assists substantially in the suppression of the superradiance of the infrared transition.

3. The invention defined in claim 1 wherein the mirror transmission is in the range of 0.8% to 1.5%.

4. The invention defined in claim 1 wherein the laser has a length long enough to produce an output power in excess of ten milliwatts.

5. The invention defined in claim 2 wherein the isotope mixture of the Neon gas comprises substantially equal amounts of $Ne^{20}$ and $Ne^{22}$.

6. The invention defined in claim 4 wherein the laser has a length of at least twenty inches.

7. A method of suppressing unwanted infrared lasing activity in a Helium-Neon gas laser of the kind having a cavity between two end mirrors and in which a 0.6328 micron red photon transition shares the same upper level state as a 3.39 micron infrared photon transition so that both transitions compete for the resources of the same common source, said method comprising, constructing the mirror transmission to be an amount not greater than 1.5% and matched to the amount of mirror transmission that causes the gain of the 0.6328 micron red photon transition to suppress the gain of the 3.39 micron infrared photon transition in the saturated gain, equilibrium state of operation of the laser so that the unwanted infrared lasing activity is suppressed without the need for magnets around the cavity bore.

8. The invention defined in claim 7 including reducing the peak gain to suppress the superradiance of the infrared transition, said reducing the peak gain including using a mixture of $Ne^{20}$ and $Ne^{22}$ isotopes in a ratio, such that the substantial offset of the center of the gain curve for the $Ne^{22}$ isotope from the center of the gain curve for the $Ne^{22}$ isotope reduces the peak gain by an amount which highly suppresses the superradiance of the infrared transition.

9. The invention defined in claim 7 wherein the gas laser is a Helium-Neon gas laser and the mirror transmission is in the range of 0.8% to 1.5% for the higher power Helium-Neon laser design.

* * * * *